United States Patent [19]

Schmidt

[11] Patent Number: 5,271,586
[45] Date of Patent: Dec. 21, 1993

[54] FIXING ARRANGEMENT

[75] Inventor: Bernhardt J. Schmidt, Neuenrade, Fed. Rep. of Germany

[73] Assignee: Walter Stauffenberg GmbH & Co. KG, Werdohl, Fed. Rep. of Germany

[21] Appl. No.: 795,483

[22] Filed: Nov. 21, 1991

[30] Foreign Application Priority Data

Aug. 24, 1991 [DE] Fed. Rep. of Germany ....... 4128157

[51] Int. Cl.⁵ .............................................. F16L 3/00
[52] U.S. Cl. ..................................... 248/58; 248/68.1; 411/85
[58] Field of Search .................... 248/49, 58, 68.1, 72; 411/84, 85, 104; 403/348, 405.1, 406.1, 407.1

[56] References Cited

U.S. PATENT DOCUMENTS

| 800,052 | 9/1905 | Ayres | 248/68.1 X |
| 3,295,805 | 1/1967 | Girard | 248/68.1 |
| 3,432,197 | 3/1969 | Albertine et al. | 411/85 X |
| 4,645,393 | 2/1987 | Pletcher | 411/84 |
| 4,830,531 | 5/1989 | Condit et al. | 411/85 X |
| 4,904,105 | 2/1990 | Myers | 403/405.1 X |
| 4,917,553 | 4/1990 | Muller | 411/85 |

FOREIGN PATENT DOCUMENTS

| 3823000 | 1/1990 | Fed. Rep. of Germany . |
| 2626942 | 8/1989 | France . |
| 2639411 | 5/1990 | France ................... 411/84 |
| 673882 | 4/1990 | Switzerland ........... 248/49 |
| 1499653 | 2/1978 | United Kingdom . |
| 2080904 | 2/1982 | United Kingdom . |

*Primary Examiner*—David A. Scherbel
*Assistant Examiner*—Derek J. Berger
*Attorney, Agent, or Firm*—Salter, Michaelson & Benson

[57] ABSTRACT

An arrangement for fixing a clamp to a C-shaped rail comprises a fixing plate urged against inner arms of the rail by a compression spring, the plate having a width which fits between inner arms so that it can be inserted from above, and a length, which fits between the arms of the C-shape, diagonally opposite portions of the ends of the plate being shaped to permit it to rotate between the arms of the rail. The spring is located between the head of a spigot fixed to the fixing plate and a supporting plate. The ends of inner arms are arranged to be located in grooves in the fixing plate.

4 Claims, 2 Drawing Sheets

FIXING ARRANGEMENT

BACKGROUND OF THE INVENTION

The invention relates to a fixing arrangement for attaching pipe, hose or cable clamps to supporting rails having a C-shaped cross section.

Known fixing arrangements comprise two clamp elements which together form a substantially cylindrical opening and are provided each side of this receiving opening with parallel bores for fixing screws, the bores running perpendicular to the bearing surface. These bores are provided with a counterbore starting from the underside of the respective clamp half and having a larger diameter, into which a cylindrical spigot of a fixing nut engages in the lower clamp half, said nut being mounted in the guide rail.

In one known fixing element of this type, (see GB 1 499 653) the fixing nut is provided with a head and a portion formed as a spigot or nipple having a smaller diameter. The spigot engages through a bore in a fixing plate and the nut head abuts the underside of the fixing plate. A helical compression spring is located on the nut head and is supported against the bottom of the supporting rail. The fixing plate has a length which substantially corresponds to the inner spacing between the outer limbs of the supporting rail. Such a fixing element can only be introduced into the supporting rail from one end. Thus the spring slides on the bottom of the supporting rail which has to be additionally guided in order to avoid misalignment.

SUMMARY OF THE INVENTION

The present invention seeks to provide a fixing arrangement for pipe, hose and cable clamps of the said type which can be applied at any desired location on the supporting rail and can be precisely positioned without difficulty.

According to a first aspect of the present invention, there is provided a fixing arrangement for pipe, hose and cable clamps on a supporting rail with a substantially C-shaped cross section having a web and two arms with ends remote from said web, said ends of said arms each being bent inwards, said arrangement comprising a fixing plate arranged to be located within said C-shaped cross section against said ends, a spigot having first and second ends, said spigot being fixedly attached at said first end to said fixing plate and having a head formed at said second end, a supporting plate arranged over said fixing plate and having a central substantially U-shaped portion said U-shaped portion having end portions extending laterally therefrom, said end portions of said supporting plate lying in a common plane and said central portion being arranged to be located between said ends of said arms of said supporting rail, said central portion of said supporting plate having a hole, said spigot passing through said hole, and a compression spring arranged around said spigot between said spigot head and said supporting plate to resiliently urge said fixing plate against said ends of said arms of said supporting rail, wherein said fixing plate has a width slightly smaller than the distance between said ends of said arms of said supporting rail, and wherein said fixing plate is shaped so as to be pivotable through a right-angle under said arms.

According to a second aspect of the present invention there is provided a fixing arrangement comprising a fixing plate arranged to be attached to a support rail with a substantially c-shaped cross section having a web and two arms with ends remote from said web, said ends of said arms being bent inwards, said plate having a width slightly less than the distance between said inwardly bent ends, said plate having a length substantially corresponding to the distance between said arms, said fixing plate having ends shaped at diagonally opposite corners to permit rotation of said plate between said arms.

BRIEF DESCRIPTION OF THE DRAWINGS

A preferred embodiment of the present invention will now be described, by way of example only, with reference to the accompanying drawings, of which.

DESCRIPTION OF THE PREFERRED EMBODIMENT

Basically the present invention provides a fixing arrangement for pipe, hose and cable clamps on a supporting rail with a substantially C-shaped cross section, the end of the arms of which are each bent inwards, the arrangement comprising a fixing plate which is arranged to be located within the C-section against said ends, a spigot fixedly attached at one end to the fixing plate and having a head formed at its other end, a supporting plate arranged over the fixing plate and having a central substantially U-shaped portion with end portions extending laterally therefrom, the end portions lying in a common plane and the central portion being arranged to be located between said ends of the arms of the supporting rail, the central portion having a hole through which the spigot passes, and a compression spring arranged around the spigot between the spigot head and the supporting plate to resiliently urge the fixing plate against said ends of the arms of the supporting rail, wherein the fixing plate has a width (B) slightly smaller than the distance between said ends of the arms of the supporting rail, and is shaped so as to be pivotable through a right-angle under said arms.

The invention also provides a fixing arrangement with a fixing plate arranged to be attached to a support rail with a substantially C-shaped cross section, the end of the arms of which are each bent inwards, the plate having a width (B), which is slightly less than the distance between said inwardly bent ends, and a length ($L_1$), which substantially corresponds to the distance ($L_2$) between the arms defining the C-shape, the ends of the fixing plate being shaped at diagonally opposite corners to permit rotation of the plate between the arms defining the C-shape.

Figure 2:
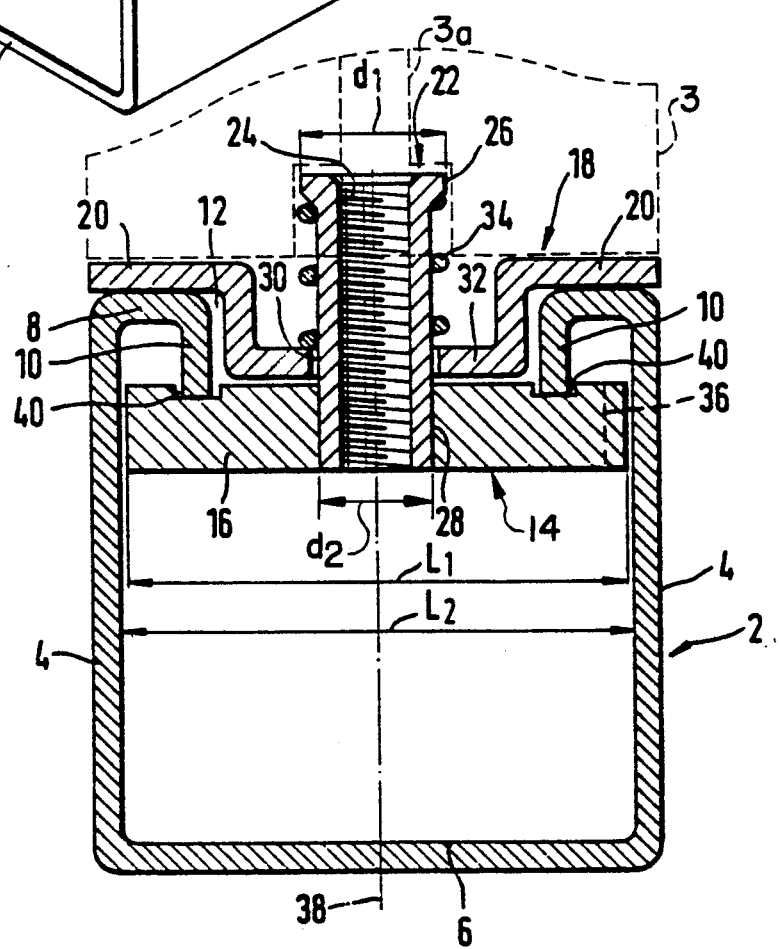
FIG. 2 shows a cross section through the spigot axis of the fixing element in its position in the supporting rail.
Figure 3:
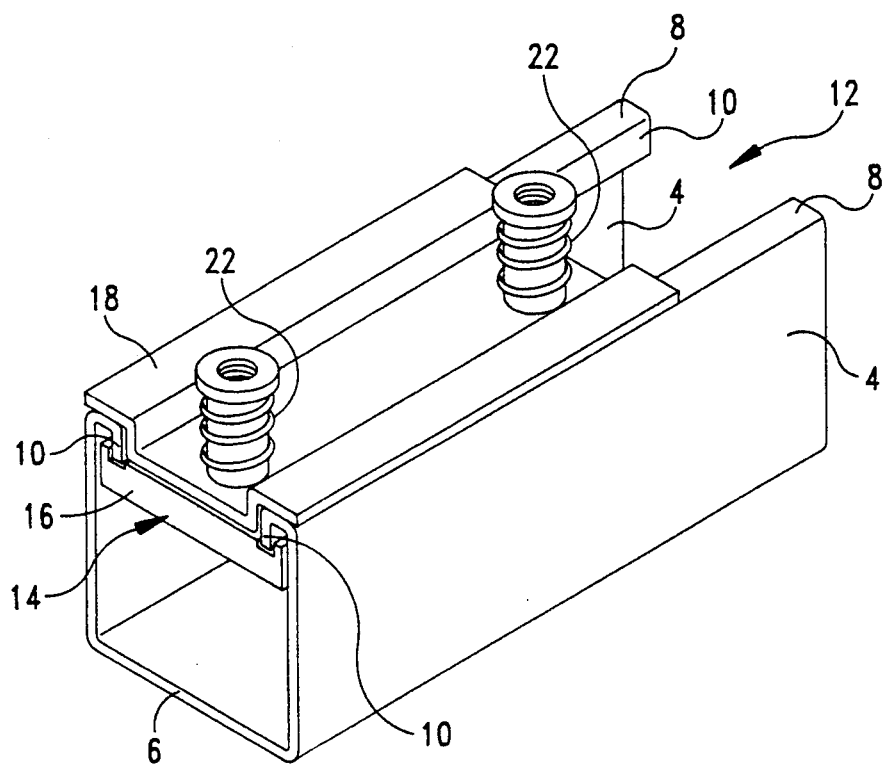
FIG. 3 shows a perspective view of an alternative embodiment of the instant fixing element.

Referring to the drawings, the fixing arrangement in accordance with the present invention is intended for use in conjunction with C-rails 2, such as are frequently used for fixing pipe, hose and cable clamps 3 (see FIG. 2). The ends of the two arms 4 of these C-shaped rails 2 are bent twice inwards by 90 degrees. Thus there are formed a first arm 8, running parallel to the bottom or web 6 of the supporting rail in each case, and a second arm 10 running parallel to the arms 4 and directed downwards towards the bottom 6. There is a longitudinal opening 12 between the inner arms 10.

A fixing element 14 comprises a fixing plate 16. The latter has a length $L_1$ which is slightly smaller than the spacing $L_2$ between the arms 4 of the supporting rail 2. The width B of the fixing element is selected so that this fixing plate can be introduced into the supporting rail from above through the opening 12 formed between the inner arms 10.

The fixing element 14 also has a supporting plate 18 which is provided in its central region with a U-shaped portion which engages between the inner arms 10 of the supporting rail. With its ends 20 lying in a plane the supporting plate bears on the arms 8 of the supporting rail and its length is preferably dimensioned so that the ends of the arms 20 are in alignment with the outside of the arms 4 of the supporting rail. The clamp 3 to be fixed bears on these arms and may be of known constructional type such as is shown in the drawings (FIG. 2).

There is also provided a guide spigot or nipple 22 with an inner thread 24. This guide spigot is formed cylindrically and .is formed with a diameter $d_1$ at its upper portion and with a diameter $d_2$ below. In this way a spigot head 26 is formed with which the guide spigot is guided in the counterbore of the clamp to be fixed. The other end of the guide spigot is inserted into a bore 28 of the fixing plate 16 and is connected thereto so as to prevent relative translational or rotational movement. The guide spigot is passed through a bore 30 in the bottom 32 of the U-shaped portion of the supporting plate 18 with sufficient play so that the guide spigot can be rotated in the supporting plate. Between the upper side of the bottom 32 of the U-shaped portion of the supporting plate and the underside of the spigot head 26 is arranged a compression spring 34.

Figure 1:
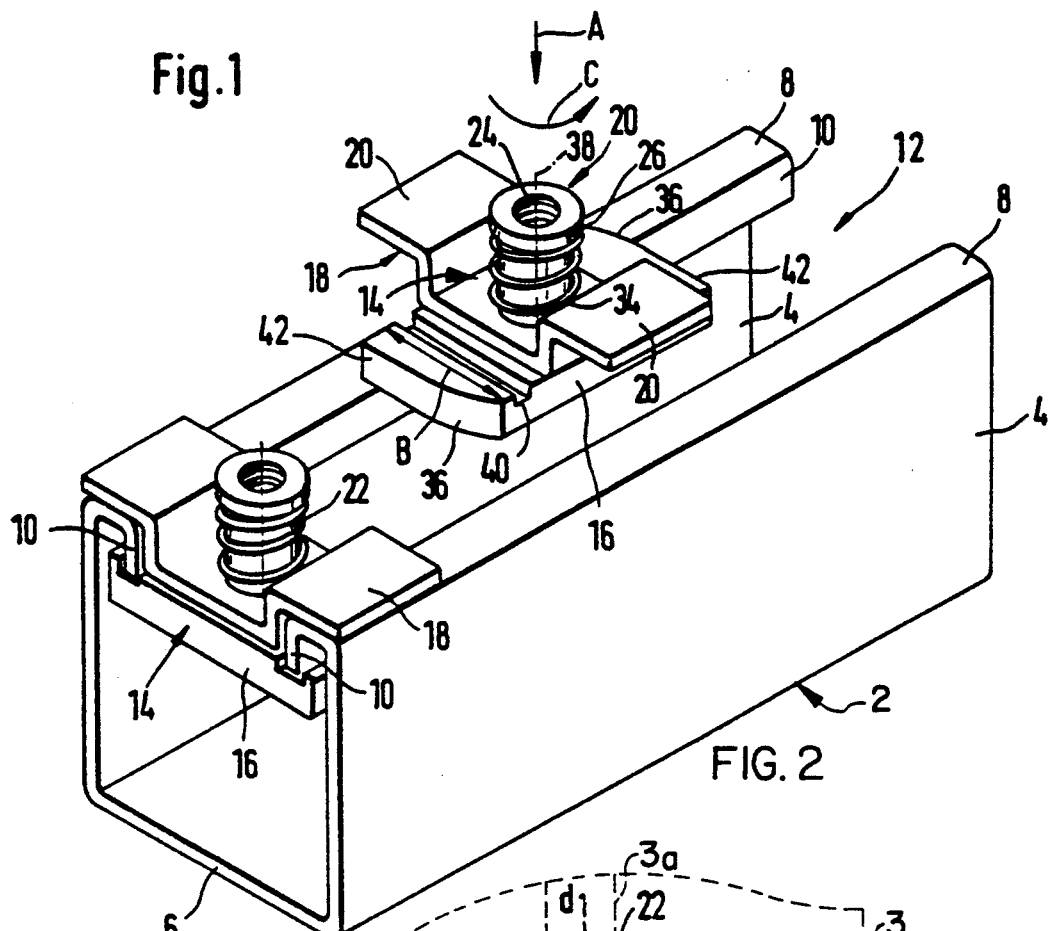
FIG. 1 shows in a view inclined from above a supporting rail with a fixing element in its position in the supporting rail and a second fixing element ready to be inserted into the supporting rail.

As is apparent from FIG. 1 the fixing plate is provided at its end surfaces on diagonally opposite portions with a rounding off 36 which corresponds for example to an arc about the axis 38 of the bore 28 in the fixing plate with half the length of the fixing plate as the radius. Instead of an arc a straight portion lying on the chord of this arc may be provided.

In a preferred embodiment parallel grooves 40 are formed on the upper side of the fixing plate 16, their spacing and width being selected so that in the transverse position of the fixing plate 16 in the rail 2, shown in FIG. 2, the ends of the inner arms 10 engage into these grooves. Through this engagement the fixing plate is mounted in positive or form-locking manner to prevent rotation when screwing in and unscrewing the fixing screw for the clamp into the thread of the guide spigot. Further form-locking or positive mounting is formed by the portion of the end surfaces of the fixing plate abutting against the inside of the arms 4 of the supporting rail 2.

For assembly the supporting plate 18 is adjusted transverse to the fixing plate 16 and the fixing arrangement is then inserted between the inner arms 10 of the supporting rail, until the arms 20 of the supporting plate bear on the arms 8 of the supporting rail. By pressure in the direction of the arrow A in FIG. 1 on to the guide spigot 22 the fixing plate 16 is then moved downwards and can be rotated into its transverse position by rotation anti-clockwise—arrow C. The straight portions 42 of the end faces of the fixing plate 16 thus form a stop for the fixing plate in its transverse position. After removing the pressure the fixing element or plate is then pressed by the compression spring 34 against the ends of the arms 10 of the supporting rail 2 and is mounted so as to clamp it in the adjusted position. After releasing the clamping connection by pressure on the spigot head 26 the fixing element can also be adjusted longitudinally of the fixing rail 2. Similarly, the fixing element can also be released from the rail and removed.

The above described fixing arrangement has numerous advantages. It forms an independent unit which can be inserted into and locked at any desired position on the supporting rail. It can be inserted simply from above. Furthermore it can be changed and/or finely adjusted in its position by pressure on the guide spigot after removing the clamping force. With the arrangement of the grooves 40 the torque to be applied in order to tighten and loosen the fixing screws (not shown) for the clamps 3 is introduced into the supporting rail positively. The fixing element can be used for rails of different height. A particular advantage is that the assembly can be installed easily and securely even on vertical or overhead C-rails.

In a modification, two fixing plates 16 share a common supporting plate 18 which has a correspondingly-increased dimension parallel to the longitudinal axis of rail 1. To enable the arrangement to be used with a clamp 3 element having bores 32 at two opposed sides for receiving fixing screws, said dimension of the supporting plate is substantially equal to the width of the clamp element and two holes 30 are provided along the supporting plate 18 at a separation corresponding to the spacing between the bores 32 of the clamp 3 element. Associated with each hole 30 are a respective fixing plate 16 and an attached spigot 22, the thread 24 of which is arranged to receive a respective one of the fixing screws of the clamp element.

In further modifications, more than two fixing plates 15 share a common supporting plate 18.

It will be understood that the above description of the present invention is susceptible to various further modifications, changes and adaptations.

What is claimed is:

1. A fixing arrangement comprising a supporting rail; a fixing element; and a clamp element, said supporting rail having a substantially C-shaped cross-section, said supporting rail comprising a web, two arms extending perpendicularly upwardly from said web, said arms bending inwardly to form two co-planar first arms which extend parallel to said web, said first arms bending downwardly to form two parallel inner arms, said two upwardly extending arms being spaced by a first distance, said inner arms being spaced by a second distance, said fixing element comprising a generally rectangular fixing plate having a width slightly smaller than said second distance and a length slightly smaller than said first distance, said fixing plate including a pair of parallel grooves which are spaced apart by said second distance, a spigot comprising a shaft with first and second ends, an enlarged spigot head fixedly positioned at the second end of said shaft, and an axial threaded bore extending downwardly through said spigot head and into said shaft, a supporting plate comprising a bottom wall having a width slightly smaller than said second distance, and two spaced sidewalls which extend perpendicularly upwardly from said bottom wall, said sidewalls having outwardly facing surfaces which are spaced apart by a dimension slightly smaller than said second distance, said sidewalls bending outwardly to form two co-planar ends, said bottom wall further having a bore extending therethrough, and a compression spring, said first end of said spigot extending through said compression spring and said bore in said bottom wall of said supporting plate and being fixedly connected to said fixing plate, said compression spring being captured between the bottom wall of the supporting plate and said spigot head, said fixing plate and said bottom wall of said supporting plate being slidably received between said inner arms of said supporting rail so that the ends of the supporting plate rest on the co-planar first arms of the supporting rail and so that the outer surfaces of the sidewalls of the supporting plate engage with the inner arms of the supporting rail wherein the supporting plate is substantially prevented from rotating with respect to said supporting rail, said fixing plate being rotatable by 90 degrees relative to said supporting rail and said supporting plate by rotation of said spigot head so that the parallel grooves in said fixing plate are in alignment with the inner arms of the supporting plate, said compression spring automatically urging said grooves into engagement with said inner arms.

2. In the fixing arrangement of claim 1, said spigot head extending above the plane of said ends of said supporting plate, said clamp element being seated on the co-planar ends of said supporting plate, wherein the spigot head is received in a counterbore in a bottom surface of said clamp element.

3. In the fixing arrangement of claim 1, said bottom wall of said supporting plate having a second bore extending therethrough, said fixing arrangement further comprising a second fixing plate, a second spigot and a second compression spring, said second spigot extending through said second compression spring and said second bore, and being fixedly attached to said second fixing plate.

4. In the fixing arrangement of claim 1, said fixing plate further having diagonally opposed, chamfered corners.

* * * * *